United States Patent
Vaculik et al.

(10) Patent No.: US 6,564,119 B1
(45) Date of Patent: May 13, 2003

(54) MULTIVARIATE STATISTICAL MODEL-BASED SYSTEM FOR MONITORING THE OPERATION OF A CONTINUOUS CASTER AND DETECTING THE ONSET OF IMPENDING BREAKOUTS

(75) Inventors: Vit Vaculik, Hamilton (CA); R. Blair MacCuish, Stoney Creek (CA); Rajendra K. Mutha, Houston, TX (US)

(73) Assignee: Dofasco Inc., Hamilton (CA)

( * ) Notice: Subject to any disclaimer, the term of this patent is extended or adjusted under 35 U.S.C. 154(b) by 0 days.

(21) Appl. No.: 09/508,969

(22) PCT Filed: Jul. 20, 1999

(86) PCT No.: PCT/CA99/00647

§ 371 (c)(1),
(2), (4) Date: May 30, 2000

(87) PCT Pub. No.: WO00/05013

PCT Pub. Date: Feb. 3, 2000

Related U.S. Application Data

(60) Provisional application No. 60/093,583, filed on Jul. 21, 1998.

(51) Int. Cl.[7] .......................... G06F 19/00; B22D 11/16
(52) U.S. Cl. ...................... 700/146; 700/31; 164/151.5; 164/452; 164/454
(58) Field of Search .............................. 700/29, 30, 31, 700/47, 51, 67, 73, 78, 79, 80, 145–147, 150; 164/150.1, 151.4, 151.5, 152, 155.6, 4.1, 454, 455, 451, 458, 452.453; 706/23

(56) References Cited

U.S. PATENT DOCUMENTS

| | | | |
|---|---|---|---|
| 3,478,808 A | * 11/1969 | Adams | 164/454 |
| 4,235,276 A | * 11/1980 | Gilles et al. | 164/455 |
| 4,949,777 A | * 8/1990 | Itoyama et al. | 164/453 |
| 5,020,585 A | 6/1991 | Blazek et al. | 164/452 |
| 5,257,206 A | * 10/1993 | Hanson | 700/273 |
| 5,359,531 A | * 10/1994 | Iwamoto et al. | 700/146 |
| 5,548,520 A | * 8/1996 | Nakamura et al. | 700/146 |
| 5,600,758 A | 2/1997 | Broese et al. | 706/23 |
| 5,659,667 A | 8/1997 | Buescher et al. | 706/23 |
| 5,819,258 A | 10/1998 | Vaithyanathan et al. | 707/2 |
| 5,904,202 A | 5/1999 | Adamy | 164/151.5 |
| 5,949,678 A | * 9/1999 | Wold et al. | 700/83 |
| 6,179,041 B1 | * 1/2001 | Pleschiutschnigg | 164/452 |
| 6,212,438 B1 | * 4/2001 | Reine | 700/48 |

OTHER PUBLICATIONS

Iron and Steel Engineer, May 1999, vol. 76, No. 5, Published by Association of Iron and Steel Engineers, pp. 30–34.

Multivariate Statistical Monitoring of Process Operating Performance, The Canadian Journal of Chemical Engineering, vol. 69, Feb. 1991, James V. Kresta, John F. MacGregor and Thomas E. Marlin, pp. 35–48.

Applications of Multivaraiate Projection Methods in The Steel Industry, M. Eng., Chemical Engineering, McMaster University, Hamilton, Ontario, 1995, Vit Vaculik.

* cited by examiner

Primary Examiner—Leo Picard
Assistant Examiner—Paul Rodriguez
(74) Attorney, Agent, or Firm—Ingrid E. Schmidt

(57) ABSTRACT

A method of monitoring the operation of a continuous caster in which a multivariate statistical model is developed using off-line measurements of process parameters representing normal operation of the continuous caster. On-line process parameters are measured in real time to determine if the caster operation is normal by calculating test statistics on vectors calculated using the multivariate statistical model with input from the on-line process parameters. The method may advantageously be used to predict breakouts in a continuous caster and allows an operator to take corrective action to avoid such breakouts. Corrective action may also be taken automatically.

51 Claims, 8 Drawing Sheets

MULTIVARIATE STATISTICAL MODEL-BASED SYSTEM FOR MONITORING THE OPERATION OF A CONTINUOUS CASTER AND DETECTING THE ONSET OF IMPENDING BREAKOUTS

This application claims the benefit of U.S. provisional patent application No. 60/093,583, filed on Jul. 21, 1998 and is the national stage of international application No. PCT/CA 99/00647 filed on Jul. 20, 1999.

TECHNICAL FIELD

This invention relates to a method of monitoring specific continuous steel casting machine parameters and using this information to predict the possibility for a rupture to occur in a solidified steel shell prior to actual occurrence such that action can be taken to avoid the rupture.

BACKGROUND ART

Continuous steel casting, in the iron and steel industry, is the process of converting liquid steel into solid steel slabs or strands. This transformation of state from liquid to solid is achieved through a process known as continuous casting. In this process, the liquid steel is continuously poured into an open copper mould. Cooling water is supplied internally to the mould walls so that liquid steel in contact with the copper mould solidifies forming a solid shell that contains liquid steel within the interior of the cast strand. The solidified steel shell is continuously withdrawn from the mould into additional cooling chambers of the caster, where the remaining internal liquid steel solidifies under controlled cooling conditions.

During the casting process, ruptures in the solidifying shell can occur due to localized liquid steel not solidifying properly. When such a rupture reaches the end of the mould, molten steel spills through the rupture and causes extensive damage to the caster. This phenomenon is known as a breakout. Breakouts result in a large maintenance cost and production losses and can lead to hazardous conditions that adversely impact production safety. Breakouts can be avoided if the casting speed is reduced whenever the steel does not solidify properly. Reduction in casting speed gives more time for the steel to solidify and also reduces productivity. To avoid the occurrence of a breakout, it is critical to predict improper solidification of the steel shell with enough lead time to take corrective action.

Casters in the steel-making industry typically use breakout detection systems that look for specific patterns in the mould temperature readings. These pattern-matching systems are based on past caster breakout experience. Rules are developed that characterize the patterns in the temperatures prior to the incidence of a breakout. If patterns in the mould temperature readings follow these rules, there is a high likelihood that a breakout will occur. If the conditions of these rules are met, the typical breakout systems output an alarm to the operator to take the necessary action to prevent the breakout or take the action automatically. This normally means slowing down the casting speed. However, only a subset of all process data from the caster operation is used in developing these rules. These rules typically involve finding specific differences and rate of change variations for specific mould temperature readings. Typical rules are of the following style:

the rate of change for thermocouple A is greater than X degrees Celsius for Y consecutive readings;

the reading from thermocouple B is greater than the reading from thermocouple C for Z consecutive readings.

Current industrial breakout detectors generate an alarm only when a predetermined set of rules has been satisfied, indicating that a breakout is imminent. These systems provide a binary signal as output, alarm or not. There is no indication as to when the system is approaching alarm or the severity of the alarm. In some cases, there is not enough lead time to react to prevent the breakout from occurring. This inevitably results in some breakouts occurring without detection. To date, no known system has been able to detect every type of breakout. Having some breakouts is considered part of the cost of operating a continuous caster.

Pattern-matching detection systems of this type are described by Yamamoto et al in U.S. Pat. No. 4,556,099, Blazek et al in U.S. Pat. No. 5,020,585, Nakamura et al in U.S. Pat. No. 5,548,520, and by Adamy in U.S. Pat. No. 5,904,202.

In addition to prior art in the field of breakout detection systems for continuous casters, Applicant is aware of prior art in the area of process monitoring and fault detection. For example, a class of monitoring systems has been described in the *Canadian Journal of Chemometrics*, Vol. 69, by Kresta, MacGregor, and Marlin in 1991 (and by others since), based on the use of a multivariate process model to describe the normal operation of a process. In this approach, new data are supplied to a model in real time, and calculations are made to determine a prediction error and summary, (latent), variables. These calculated data are then tested to determine if the process is operating normally or not. This is basically the approach adopted by Wang et al for detecting faults in wafer fabrication tools as described in U.S. Pat. No. 5,859,964.

A flowchart of a generic monitoring system as described by the published prior art is shown in FIG. 1.

Such a system is typically deployed on a computer with access to sensor signals from field instruments using a video monitor for output display. The system acquires the process signals as input to a mathematical model and computes output values as depicted in Block 10. Block 12 provides for the computation of test statistics such as a prediction error to be used in the next step. The decision whether or not the new observation is normal is made in Block 13. Threshold tests are done on the test statistics to determine the likelihood of the new observation belonging to the set of normal operation. If the new data are deemed normal, the system repeats the process from Block 10 at the next sample interval, but, if the likelihood is sufficiently low, a signal is issued to take corrective action on the process, either manually or automatically. Block 14 provides for determining contributions to the test statistics. Information to direct appropriate actions is displayed. The final block shown in the figure, Block 15, provides for corrective action to be taken to avert or mitigate the fault detected above. The system continues to loop through the algorithm starting again at Block 10.

This approach was tested to determine if it was applicable to a continuous casting process by Vaculik in 1995. The results of this off-line work showed the applicability of the technology to the particular process and are fully described in Vaculik's Master Thesis entitled *Applications of Multivariate Projections Methods in the Steel Industry*, M. Eng. Chemical Engineering, McMaster University, Hamilton, Ontario, 1995, the disclosure of which is herein incorporated by reference. What is not included in this work, however, are details required to implement a viable on-line system. The work did provide motivation for the development of an on-line system to detect abnormal operation, including breakouts. Several significant innovations were required to realize the system in its present form. These novelties are departures from prior art and are integral to the successful operation of the system; they are described below.

DISCLOSURE OF INVENTION

The invention is an on-line monitoring and fault detection system for a continuous casting process based on the application of a multivariate model of normal process operation. Additional aspects of the invention deal specifically with on-line system implementation and model development not found in the prior art.

In accordance with this invention, it is proposed to use an extended set of process measurements, beyond the standard mould temperatures, to develop a multivariate statistical model to characterize the casting process. The model is then used in the context of a monitoring system that detects exceptions to normal operation and predicts breakouts in the continuous casting process allowing for corrective action to be taken to avoid a breakout. The system is implemented on a computer using sensor inputs from the casting process to provide input data.

The invention relates to predicting the occurrence of improper solidification of the steel in a caster mould. This prediction process is based on a multivariate statistical model of normal caster operation. The model is developed using the statistical modelling technique, Principal Components Analysis (PCA). PCA is a method of decomposing a matrix of data into a set of vectors and scalars. This method yields a model that projects the original data onto fewer variables without loss of information. The model results are then used to calculate test statistics from which the condition of the caster may be inferred. If the condition warrants, the system will generate warnings and alarms so that corrective action may be taken. This action may be taken manually by the operator or may be automatically controlled by output signals from the system.

The invention includes the following aspects that arise solely in the case of on-line implementation;

input data pre-processing in the form of filtering specific signals to address non-stationarity, or drift, in the process;

ability to dynamically compensate for missing or invalid input data;

ability to dynamically switch models from one operating regime to another;

consolidation of model outputs to facilitate monitoring in fewer dimensions;

implementation of alarming logic that works with the detection algorithm to reduce the false alarm rate;

presentation of the information is organized using a hierarchical structure;

presentation of the system output is done using visual and audible indication; and presentation includes a graphical indication of the influence of the process parameters on the level of the test statistics.

In addition, the invention includes the process used to develop a model for the system, a prerequisite for successful on-line implementation. There are a number of aspects to this process that are critical to the performance of the system, including:

selection of the process parameters to be used in the model as inputs, this includes the addition of lagged variables to add dynamic information to the model;

selection of the dataset to be used to fit the model parameters;

selection of the number of significant components in the PCA model; and determination of appropriate detection thresholds for the test statistics.

A flowchart specific to this system and including the points described above is shown in FIG. 2. Notable differences from FIG. 1 include model development and system implementation features.

The monitoring system implementation portion of the flowchart in FIG. 2 differs from the generic case as described in prior art and seen in FIG. 1, with the addition of the following steps:

data pre-processing between the data acquisition and the model computations (step 32), model output consolidation (step 34), alarming logic for more robust on-line decisions (step 36), specific output processing (step 37).

DESCRIPTION OF DRAWINGS

In order to better understand the invention, a preferred embodiment is described below with reference to the accompanying drawings, in which.

BEST MODE FOR CARRYING OUT THE INVENTION

Figure 1:
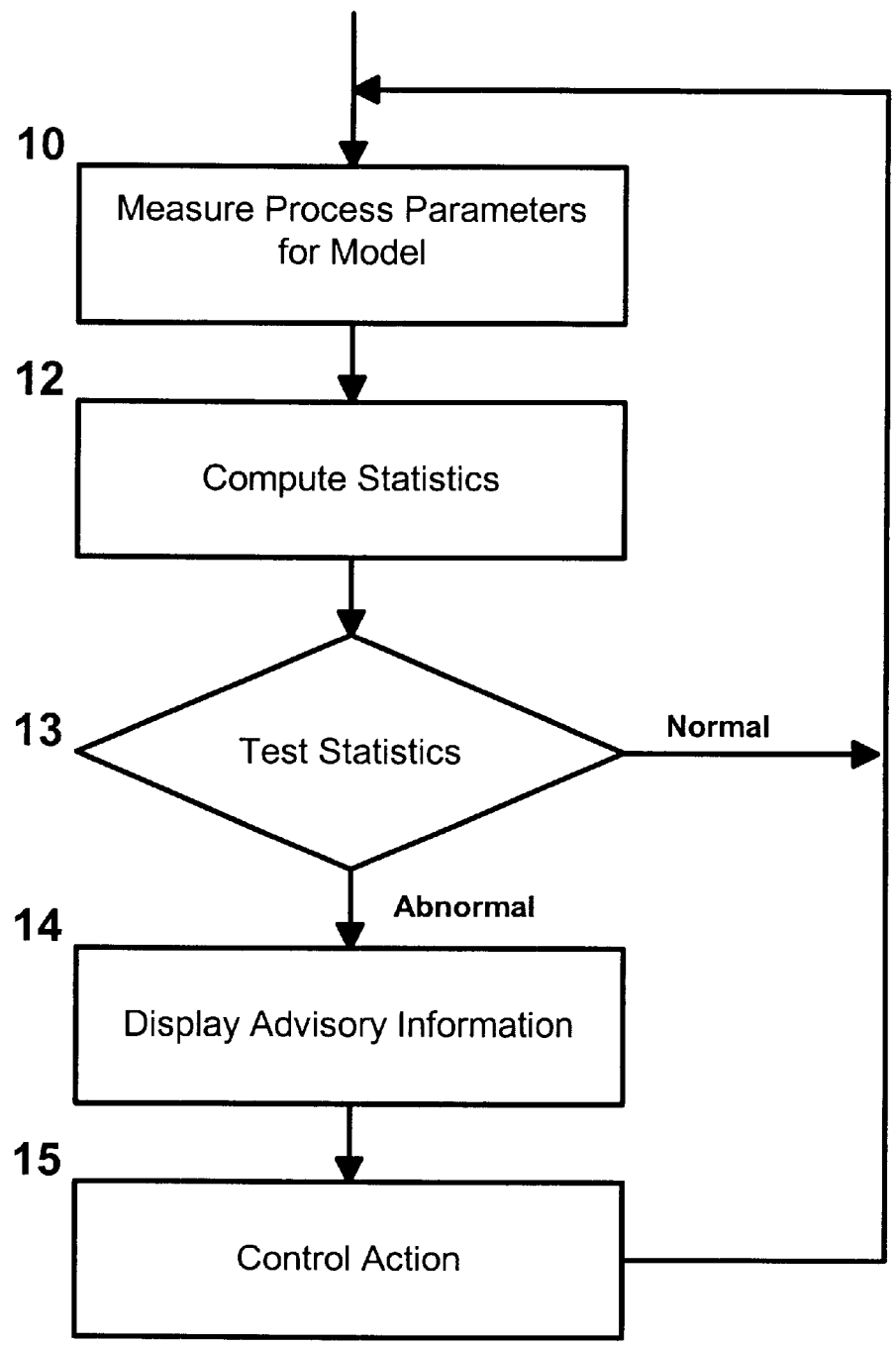
FIG. 1 is a flowchart depicting a typical implementation of a model-based monitoring system.
Figure 2:
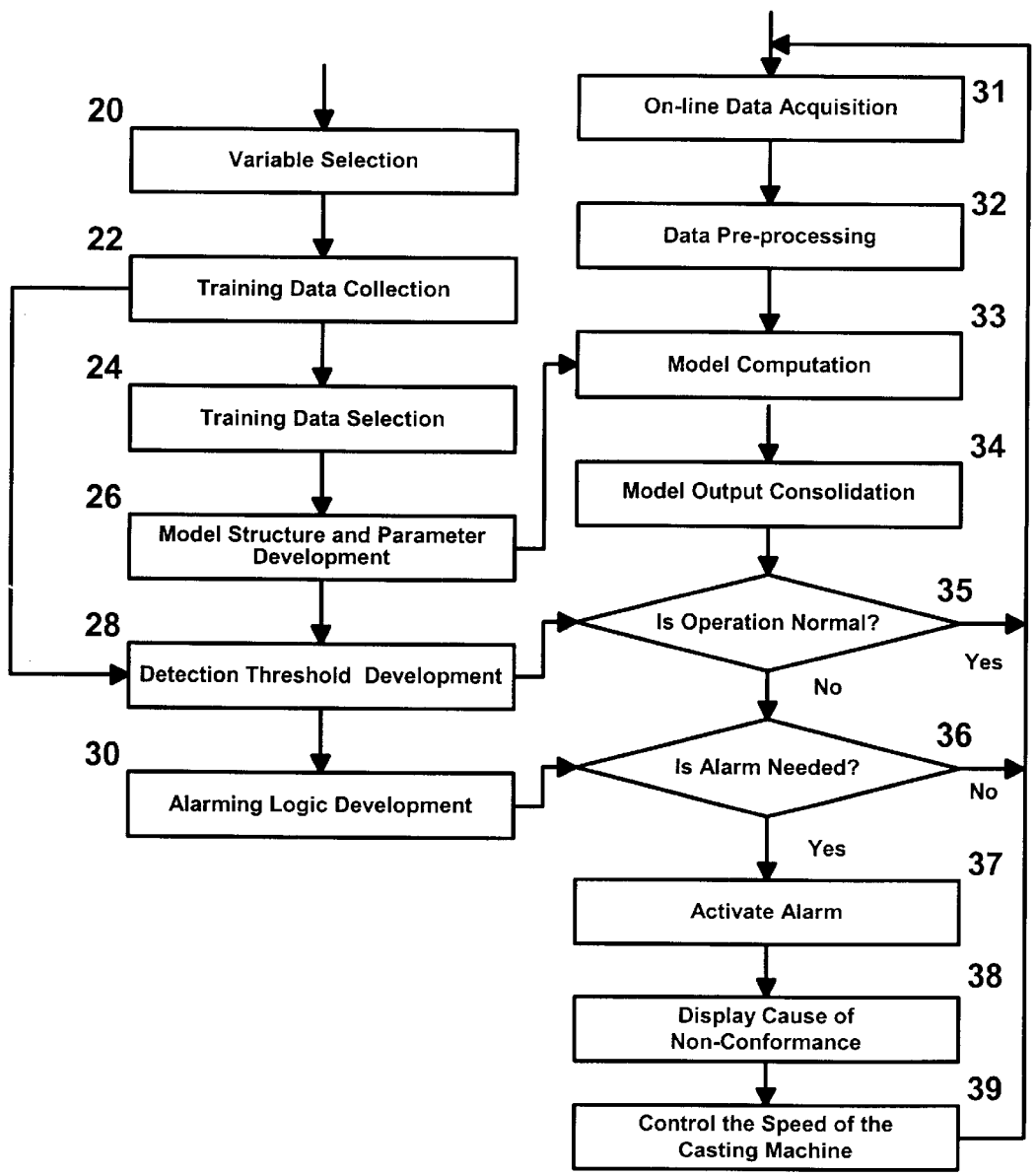
FIG. 2 is a flowchart depicting the application of a model-based monitoring system to a continuous caster in accordance with the invention.

The invention is an on-line monitoring and fault detection system for a continuous casting process based on the application of a multivariate model of normal process operation. As indicated above, additional aspects of the invention include the process by which the model is developed. The first step in this process, identified by numeral 20 in FIG. 2, is determining which variables to include in the model.

Variable Selection

Selection of the process parameters to be used in the model as inputs is based on understanding the continuous casting process.

The model was developed using the following variables:
- mould thermocouple readings;
- lagged mould thermocouple readings;
- temperature differences between vertical pairs of thermocouples;
- caster speed;
- lagged caster speed;
- mould width;
- mould level;
- mould oscillation frequency;
- mould cooling water temperature differences (i.e., between inlet to mould and outlet from mould);
- mould cooling water flows;
- tundish weight;
- tundish temperature;
- calculated clogging index.

In the above list of variables, the calculated clogging index is the only input that is not directly measured. It is derived from the ratio of the actual position to the predicted position of the control valve controlling the flow of hot metal from the tundish into the mould to regulate the mould level.

These variables define the operation of the continuous caster system. Each variable in the above list contains information or has an impact on the status of the solidification process in the mould. Since the material behaviour in the mould is critical to the shell integrity, the mould is typically instrumented with numerous thermocouples.

Figure 8:
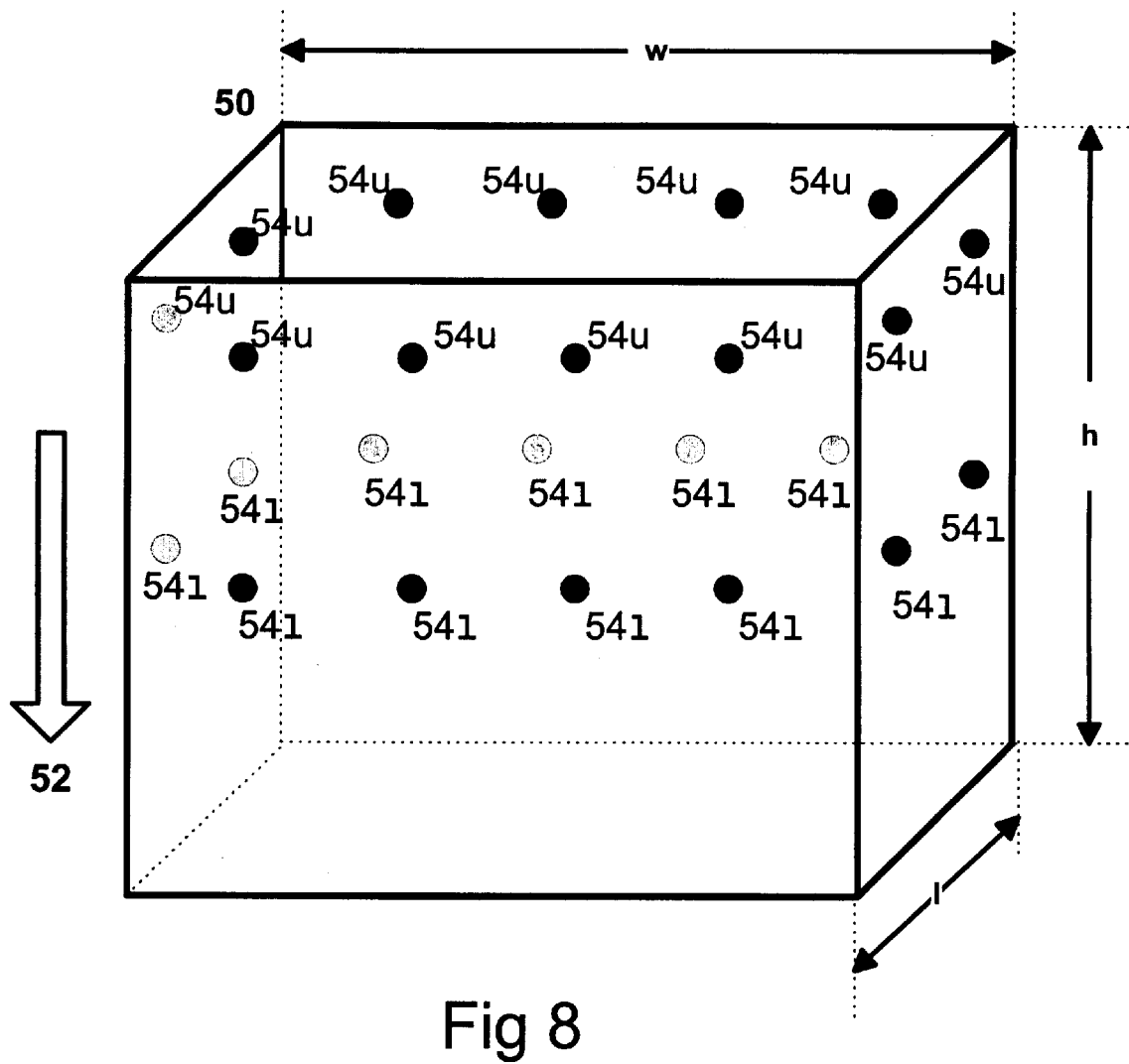
FIG. 8 is a schematic of a continuous casting mould and provides an indication of thermocouple locations on the mould.

FIG. 8 shows a typical mould thermocouple configuration. A mould 50 is drawn having a variable width w, a fixed length l, and a fixed height h, the resulting casting having a cross-section defined by the width w and length 1, and the casting direction from the top of the mould to the bottom of the mould being indicated by arrow 52, parallel to the height h of the mould. At a minimum, thermocouples 54 are distributed around the mould 50 in two rings, thermocouples in an upper ring are indicated as 54$u$ and thermocouples in a lower ring are indicated as 5$l$. The thermocouples 54$u$ in the upper ring are equally spaced from each other along the width and length of the mould 50 at a predetermined upper height and the thermocouples 54$l$ in the lower ring are equally spaced from each other along the width and length of the mould 50 at a predetermined lower height, approximately 150 mm below the thermocouples 54$u$ in the upper ring. The lower thermocouples 54$l$ are placed directly below the upper ones 54$u$ to form vertical pairs.

The sampling rate of the data is no less than once per second for the on-line system to be effective, and preferably no less than twice per second.

Availability of sensing equipment and automation infrastructure varies between casters. As a minimum requirement, a number of essential signals must be available to the system. These essential signals are:
- mould width;
- mould thermocouple readings from thermocouples, arranged in rings around the mould so as to form vertical pairs;
- lagged mould thermocouple readings;
- temperature differences between vertical pairs of thermocouples;
- caster speed;
- lagged caster speed;
- mould level;
- mould-cooling water flow;
- mould-cooling water temperature differences (i.e., between inlet to mould and outlet from mould);
- a measure of the mould level control actuator (e.g., clogging index).

If more signals are available, they may add to the quality of the model and improve the monitoring system performance.

Model Development

Principal Component Analysis (PCA) is a linear method and is not well-suited to explaining the whole range of operation of a continuous caster. The major obstacles to be overcome in the implementation of an on-line system are the variable number of active thermocouples due to cast width, the effect of speed changes on the signal characteristics and the behaviour of various grades of steel in the casting process.

In the course of caster operation, the width of the mould (50) is modified by moving the narrow faces in and out. The relevance of the signals provided by the outer thermocouples on the broad faces of the mould depends on the mould width.

In normal caster operation, it is preferable to cast at a constant speed, but the cast speed can, and does, change for a variety of reasons. A speed change effectively acts as a disturbance to the process and produces transient effects in the process signals.

The grade of steel or recipe determines the process behaviour due to changes in material properties. The main concern is the effect of casting peritectic grades (Medium Carbon) on process stability and how these grades affect the variability of the process signals.

These issues are not addressed in prior work and only arise in the context of an on-line system.

Since the number of active thermocouples changes with cast width, i.e., more thermocouples are active on the widest product than when cast width is small, this effectively changes the number of inputs to the model and affects the structure of the model. Hence, separate PCA models are required for each predetermined cast width range. The number of models is determined by the number of operating regimes, each with a distinct number of active thermocouples.

Hence, the number of models required for the system is determined by the number of models required to cover distinct operating regimes over the width range of the caster. In a specific case at the #1 Caster at the premises of Dofasco Inc., Hamilton, Ontario, Canada, two models are required, one for wide slabs and one for narrow slabs, each covering the range of operating speed. Model selection in the on-line system is based on the measured mould width.

To compensate for speed changes, the addition of lagged variables to add dynamic information to the model was done to incorporate dynamic behaviour of the caster into what is essentially a steady state model of the process. A novel approach was developed to capture trends in the data and compensate for changing speeds. This was done by sampling past readings of the cast speed measurements and using these as input parameters to develop the PCA model. Specifically, the speed over the previous five consecutive samples (covering the past 2.5 seconds of operation), the speed 7 samples or 3.5 seconds ago and the speed as measured 10 samples or 5 seconds ago, were used. This approach effectively accounts for the dynamics of the casting process and enables the use of a single model to cover the entire operating speed range of the caster for each of the wide and narrow width ranges respectively.

Selection of the Training Dataset

Off-line data collection identified by numeral 22 in FIG. 2 and pre-processing to create a training data set identified by numeral 24 in FIG. 2 are required to develop the models identified by numeral 26 in FIG. 2 characterizing normal casting conditions. Partitioning of the data refers to categorizing the data 22 into periods of normal and abnormal operation. Numerous periods of trouble-free operation are included to determine the model for normal operation. Several specific criteria for normal operation are used for partitioning. These include:

sufficient temperature separation between upper (54*u*) and lower (54*l*) thermocouples (>10 deg. C.);

consistent temperatures in both of the thermocouple rings (+/−10 deg. C.); and stable mould level control (+/−5 mm).

The training data set is selected 24 such that it spans the range of operation i.e., data are included from the entire range of width and speed conditions, unlike the restricted subset of data considered in previous work. The data must also be balanced over the range of operation. This ensures that the model fits equally well over the entire operating window and is not biased to specific conditions. For the narrow model, the width range spans 800 mm to 1200 mm; for the wide model, the range is from 1200 mm to 1630 mm. For both, the speed range is from 600 mm/min to the maximum recorded speed for the given width range.

In addition, data from both stable and transient operation are included to cover both static and dynamic operating conditions. Including data from periods of operation where the cast speed was ramping up or down, provides additional information on process behavior and allows the system to recognize this as normal variation. Similarly, data from periods of operation where the mould width was changing, were included in the training data set. This is in keeping with the underlying point that the training set contains only data characteristic of normal operation, i.e., data that should not generate an alarm in the monitoring system.

The individual data sets that meet the criteria outlined above contain 300 samples taken over a 150-second window of operation. These sets are then concatenated to construct a large matrix of observations used for model development.

Selecting the Number of Significant Components

As part of the model development activity 26, the selection of the number of significant components in the output vector T of scores from the PCA model determines the performance of the system. The objective in selecting the number of components is to maximize the information content of the model with the fewest number of components. The number of significant components is determined by the training data 24 but is selected such that the model explains at least 80% of the variation in the data. A choice was made to select five components for the on-line system and this was based on the fact that over 80% of the variation was explained and adding more components would not increase that number significantly.

Determining the Detection Thresholds

The detection thresholds identified by numeral 28 in FIG. 2 for the test statistics are determined by the process data 22. In theory, the test statistics follow a known distribution, but, if the theoretical value is used, the system tends to alarm excessively. Hence, the detection values are derived using off-line simulation. For the purposes of simulation, it is required to distinguish between normal and abnormal operation and identify the data as such. The data are then used to simulate the operation of the caster and generate model outputs and subsequently test statistics. The simulation results indicate the levels of the test statistics and allow for the selection of threshold levels. The goal is to find levels such that the system does not alarm under normal operating conditions and always alarms under abnormal operation. Practically, this is not achievable but an optimal level can be determined based on the relative costs of erring on either side. The present thresholds provide a long-term alarm rate of under 2% for all of the test statistics.

On-line System Implementation

Once the models 26 are developed off-line, on-line implementation of the monitoring system is required and contains inventive steps in how to pre-process inputs and utilize the model output to achieve the desired result.

On-line implementation includes the integration of the off-line models in a monitoring system that runs on a computer that has access to process data 31 of the kind described above, in real time at a sampling rate of twice per second. The process data 31 is pre-processed at step 32 to provide filtered values, lagged and computed data. The monitoring system computes score values in step 33 with the model 26 developed using the training data set 24. It then takes the results of the model calculations 33 and calculates tests statistics in step 34. The statistics provide information on how the present operation conforms to the model, or the training data set 24 and, hence, infers the condition of the caster. The results are presented graphically in step 37 on a computer screen and provide visible and audible signals to the equipment operator.

Figure 7:
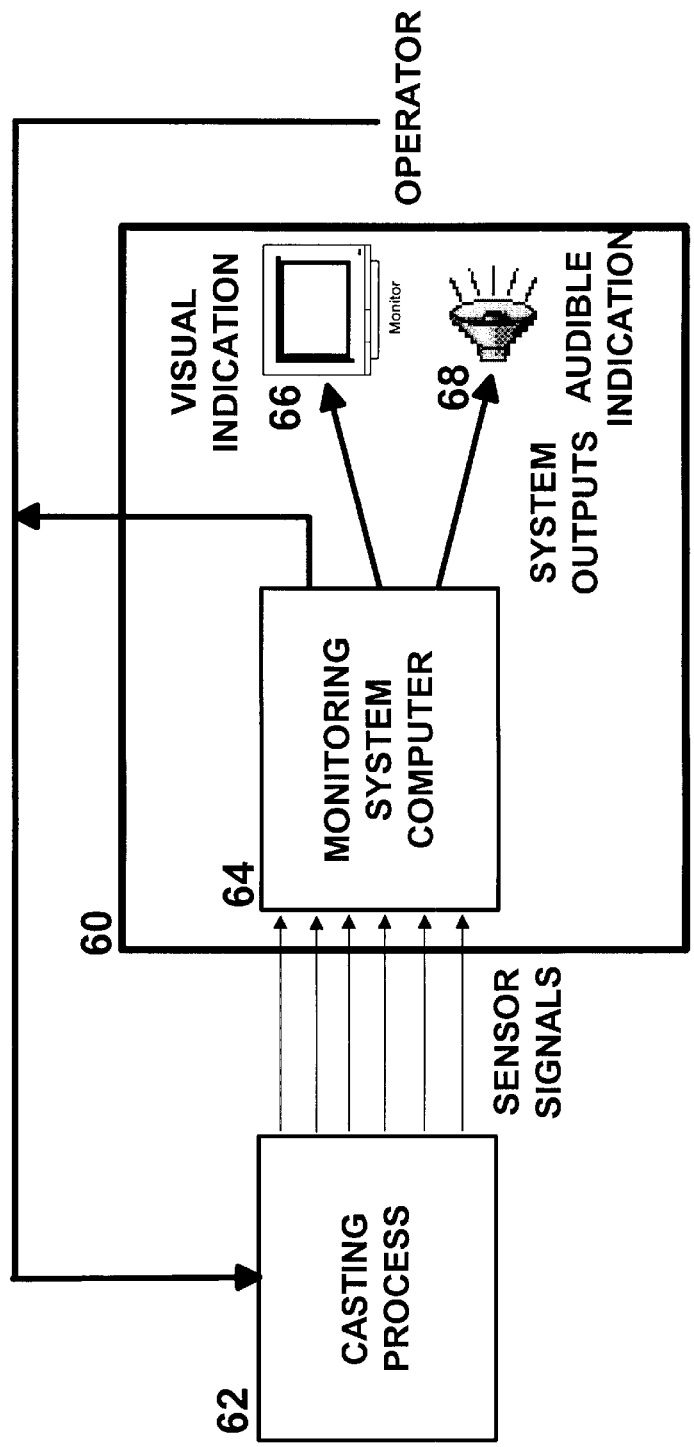
FIG. 7 is a schematic showing the basic components of an on-line system, in accordance with the invention.

The physical components for such a system 60 are shown schematically in FIG. 7.

A continuous caster is indicated generally by reference numeral 62 and is coupled to diagnostic instruments which include inter alia thermocouples 54, water flow gauges, and the like to provide process data 31 which is input into a monitoring system computer 64.

The monitoring system computer 64 has a data collection device to acquire both off-line measurements of process parameters 22 used to create the multivariate statistical model 26 and to acquire on-line measurements of process data 31. The computer 64 has computational devices configured to calculate a matrix P of coefficients using principal components analysis (PCA), to generate a vector T of scores, and to define a selected number n of significant components in said vector T. Further computations are done using the computer 64 to generate detection thresholds 28, to calculate test statistics 34 from the on-line process data 31 and to make comparisons 35 of the test statistics to the detection thresholds 28. The computer 64 is configured to generate an alarm in accordance with predefined criteria developed off-line 30, as indicated by step 36 in FIG. 2, and the alarm comprises a visual display unit 66 and a horn 68 coupled to the computer 64.

Data are continuously sampled and input to the computer 64 which is also configured to store past readings which may be used in the model calculations, and to filter data, as required. The computer 64 will provide data to the visual display unit 66 which includes graphical, diagnostic information to allow an operator to monitor the system 60 and take corrective action, as required. The computer 64 also has control means whereby the caster speed may be automatically adjusted in accordance with pre-determined alarming thresholds without any operator intervention being required.

As indicated, there are a number of features that are novel and non-obvious in the realization of such a system. These features are described in more detail in the text below.

Input Data Pre-processing

Pre-processing 32 is done in the form of filtering specific signals to address non-stationary or shifts in the process. A method of compensating for shifts in absolute temperature in the thermocouples was required for on-line implementation.

The method devised to address this employs an Exponentially Weighted Moving Average, EWMA, filter to dynamically calculate the mean of the thermocouple readings. This calculated mean is then extracted from the thermocouple temperatures to generate a deviation signal used by the model. This method is also employed on the cooling water flows and temperatures. The signals above are the only ones exhibiting shifts and have the filtering applied. The other signals are not filtered as this would lead to loss of information.

Missing or Invalid Input Data Compensation

One of the features developed for the on-line system 60 was the capacity to continue operation in the absence of a complete set of input data. On occasion, sensor signals are invalidated for a variety of reasons, including sensor calibration procedures where the sensor is taken off-line, sensor failure, sensor drift, and others. The system 60 can tag the input as missing and work with the balance of the inputs to provide monitoring and alarming as usual without the annoyance of false alarms. This is done in the model by modifying the model parameters to ignore the contribution of the missing data and increase the contribution from the valid data to provide results that are consistent with a full set of data. The method for compensating for the missing or invalid element in the input data vector involves setting the corresponding model coefficients to zero for each component. The remaining coefficients for each component are then inflated so that the sum of their squared values equals 1. This can be thought of as using the model to predict the missing value, then using that predicted value in place of the missing value in the monitoring system. Once the signal is restored to its normal state, it will be tagged as such and used in the monitoring system. This can be done for any of the input signals and it is mostly used for thermocouples that have failed in service. Other instances for use include treating the mould level signal as missing when the sensor is being calibrated and at the start of a cast sequence prior to receiving a valid tundish temperature, when the signal is marked as missing.

Model Scheduling

As discussed above, more than one model is required to cover the entire range of operation. The model to be used by the system at any given time is determined by the actual width of the strand. In fact, all models are continuously calculated, the width determines which of the outputs will be selected for detection, display, and alarming. This method provides a smooth transition between the two distinct operating regimes. In keeping with the definition of the training tests, the model switches between wide and narrow at a cast width of 1200 mm.

Consolidation and Testing of Model Outputs

To facilitate monitoring in fewer dimensions, represented by step 33 in FIG. 2, the monitoring system calculates numbers or scores forming a vector T based on preprocessed (on-line) data input Z, from step 32, to the matrix P, from step 26, according to the following formula:

$$T = P^T Z$$

where:

P is the matrix of model coefficients from PCA;

Z is the vector of variables used as model input for the current observation; and T is the vector of scores generated as model output.

As a result of using PCA, the scores in vector T have known statistical properties and can be used to test for probability or likelihood of an abnormal occurrence. As is typical with PCA, subsequent significant scores are combined to form a multivariate statistic that is tested against a single multivariate statistical distribution using another "Hotelling T" test adapted for multivariate distributions. This signal is depicted as HT2 in the system and can be seen as the right-most plot in the upper third of the main display screen shown in FIG. 3.

In addition to these two tests, the Squared Prediction Error (SPE) for the observation is also calculated and tested based on a known and univariate statistical distribution. This signal is depicted as SPE in the system and can be seen as the left-most plot in the upper third of the main display screen shown in FIG. 3.

In summary, the on-line monitoring system generates a vector of scores 33 from a large number of variables in the input data 31, based on the PCA model parameters 26. From those scores and other internal model calculations, the monitoring system then generates univariate and multivariate summary statistics (step 34) that are tested in step 35 against thresholds developed (step 28) during model development using historical data 22.

Alarming Logic

The detection results from step 35 described above are passed along to the alarm screens for further processing in step 36, if minimum thresholds of normal behaviour are not met. Filtering logic is applied to the detection results to ensure the validity of the alarm. The alarming logic determines if the alarm is persistent before issuing a visual and/or audible warning. Any alarm condition has to persist for at least five samples (2.5 seconds) prior to any indication of an alarm on a system operator screen.

The system provides a quantitative signal of a range of casting conditions from "normal" to "breakout highly likely". This gives the operator the maximum amount of information on the casting process and the maximum amount of lead time to take appropriate action when required. The system may be tuned to provide three specific alarm levels based on the results of the model, as follows:

Level 1—casting conditions are normal. The system would clear and reset any previous alarm conditions;

Level 2—casting conditions have deviated from normal; conditions for a breakout are possible. The background colour of the visual display unit 66 screen displaying the model results turns to amber;

Level 3—casting conditions have deviated significantly, such that a breakout is highly likely. The system provides an audible alarm to the operator, who is required to slow the casting speed until casting conditions have improved. Also, the background colour of the visual display unit 66 screen displaying the model results turns to red.

Presentation of Information

Figure 3:
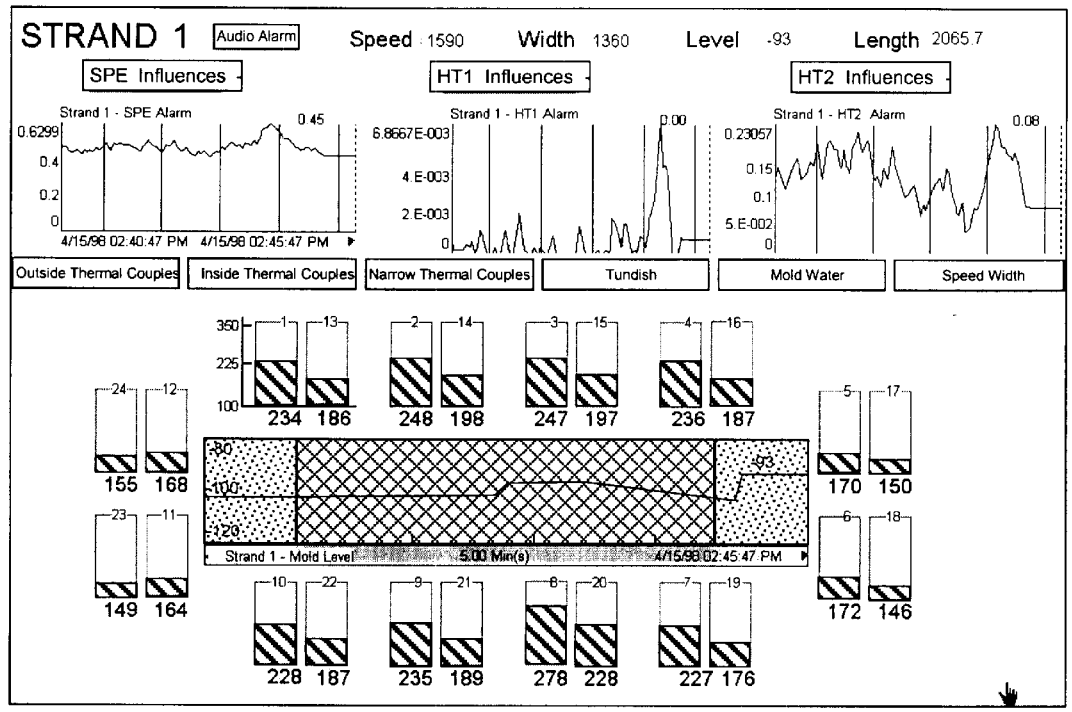
FIG. 3 is a representation of a main monitoring screen for a system in accordance with the invention.

The system operator screen has a hierarchy of displays. The highest level, of which an example is shown in FIG. 3, includes plots of the test statistics HT1, HT2 and SPE along with some operating parameters. The screen layout is such that the three summary statistics are plotted on the upper third of the screen in separate line charts. Above each chart is a selection area that provides access to the respective second level screens as described with reference to subsequent figures. The bottom two thirds of the screen are dedicated to displaying information from the mould level sensor in the form of a line chart and the individual mould thermocouples in the form of bar charts distributed in pairs around the perimeter of the mould. In addition, other data are displayed at the top of the screen numerically. These data include casting speed, strand width, mould level, cast length. There are also selection areas that allow direct access to trend plots of the sensor signals.

Figure 4:
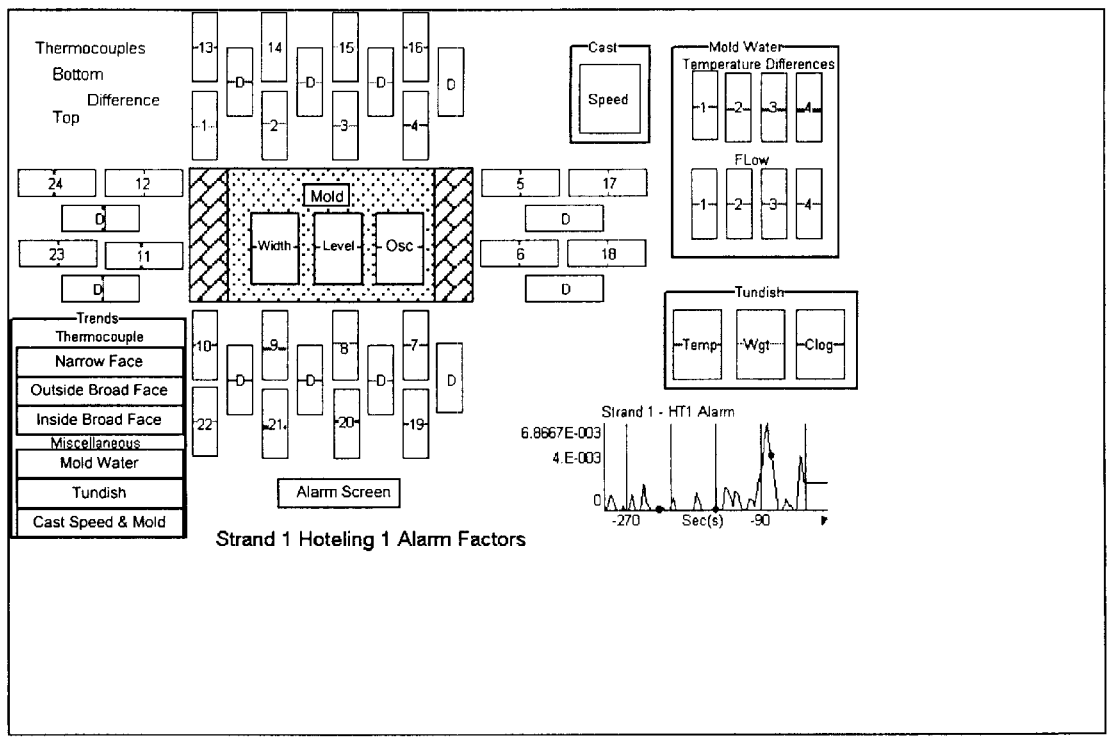
FIG. 4 is a representation of a screen that provides information as to which of the process variables is contributing to the level of a Hotelling T test for univariate distributions HT1 test statistic in accordance with the invention.
Figure 5:
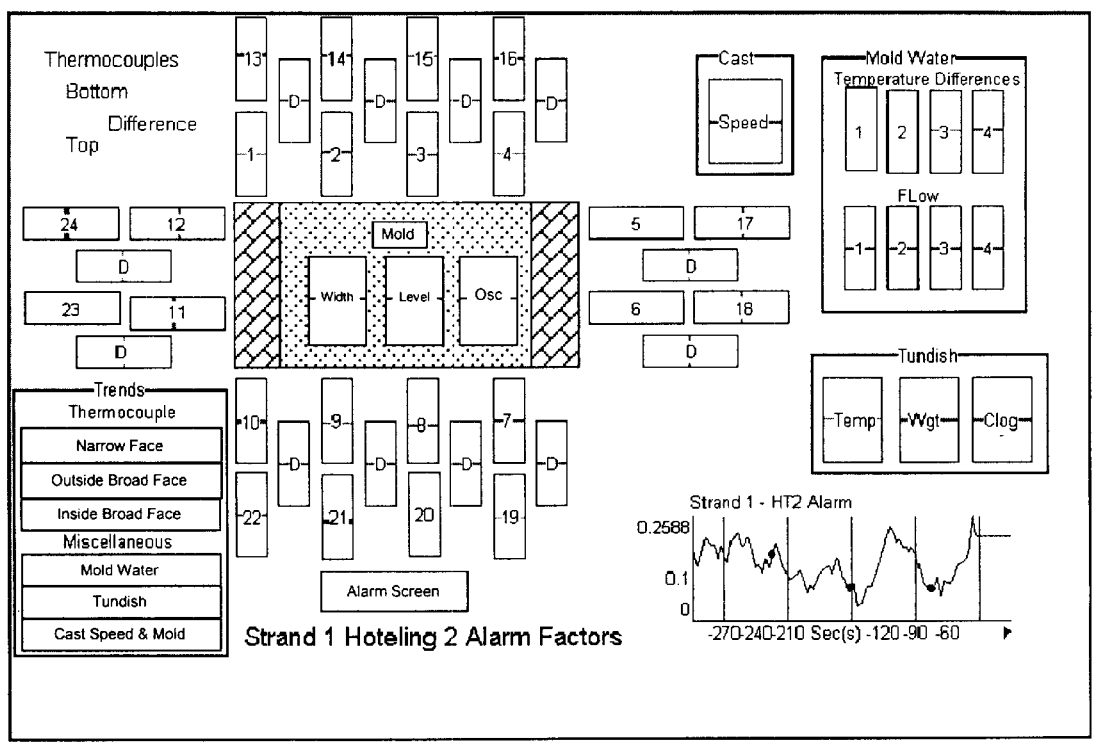
FIG. 5 is a representation of a screen that provides information as to which of the process variables is contributing to the level of a Hotelling T test for multivariate distributions HT2 test statistic in accordance with the invention.
Figure 6:
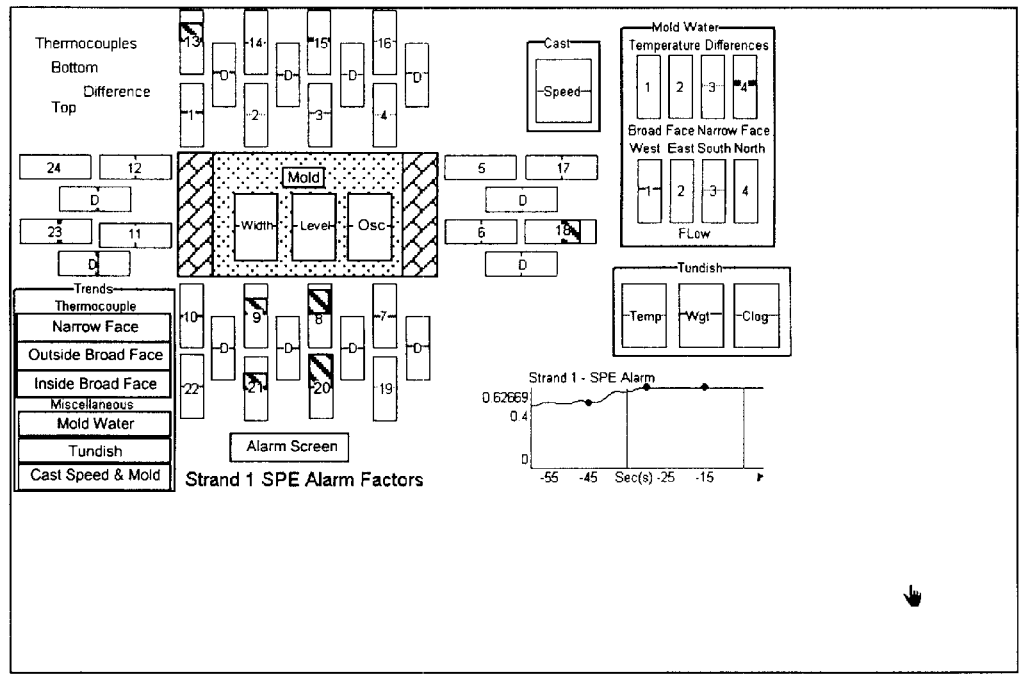
FIG. 6 is a representation of a screen that provides information as to which of the process variables is contributing to the level of a squared prediction error SPE test statistic.

The next second level screens includes the diagnostic screens for each of the test statistics, FIGS. 4, 5, and 6, that show the contribution of the process variables used as input to the model. The contributions are shown in the form of color coded bar charts that indicate the level and sense of contribution. The screen layout is such that the mould thermocouples and the differences between vertical pairs are distributed around the perimeter of a schematic of the mould. Other variables are grouped on the screens to provide an organized presentation.

The second level screens also include a selection area to return to the first level alarm screen shown in FIG. 3. Selection areas are also included to provide access to trend plots of the process variables.

The following third level (not shown) is comprised of time traces of the process variables, either grouped or individually.

The system presents the information in a simple, graphical way. On the highest level screen, as shown in FIG. 3, each of the test statistics is displayed as a graphical trend plot on the upper third of the computer screen. These plots show past values of the statistics and provide an indication of the evolution of the signal over time. The plots have been normalized such that a value of 1.0 corresponds to the individual threshold. For each of the signals, SPE, HT1 and HT2, if the value is between 0 and 0.8, the condition of the caster is considered normal. If the value falls between 0.8 and 1.0, a warning is issued and the plot background changes to amber. If the value is over 1.0, the plot background turns red and an audible alarm message is issued.

In the case of an alarm, diagnostic information can be gleaned by interrogating the model. According to the invention, contribution plots are generated in step 38 for each of the three statistics. These plots form the second level of the hierarchy of screens and indicate which of the original process variables contribute to the warning or alarm condition. This information is displayed graphically and is accessed by selecting the plot of the offending statistic. FIGS. 4 through 6 show examples of contribution plots for HT1, HT2 and SPE respectively. This information is very helpful in isolating the location of an impending breakout and in determining the cause of an abnormal condition. This information is used to direct the operator to the appropriate trend plot of the original variables in the next level of the screen hierarchy, and to take corrective action, as necessary, by slowing the speed of the casting machine to avoid the incidence of a shell rupture leaving the mould (step 39).

The system may also generate output signals automatically to avert or mitigate the alarm condition, typically, by controlling the speed of the caster.

INDUSTRIAL APPLICABILITY

The realization of a caster breakout prediction system using a multivariate model of the process requires the availability of the process measurements described above to a computer. The computer is used to calculate model outputs and statistics that are compared to thresholds to generate an output that can be used to take evasive action to avoid the breakout. An example of such a system, and the steps required to develop it, are shown in FIG. 2.

Model development is done off-line using historical data. Alarming thresholds are also determined during this development (step 30). The system that monitors the caster uses the model developed above to calculate values that are checked against the alarming thresholds and generates the appropriate output.

To develop the PCA model, a data matrix, X, is constructed with each row containing an observation, i.e., values of the process variables for the same instant in time. These observations are taken from various periods of normal operation. PCA is then used to decompose the matrix $X^T X$ and determine the number of significant components. A wide range of normal operating data, including different casting speeds and steel slab widths are used to generate the model. The resultant model provides sets of weightings that are used to generate principal component values for each multivariate observation.

In the on-line implementation, the multivariate statistical model-based breakout prediction system operates as follows. Process measurements are read every half-second. Using these and previous process measurements, the data are used as input to the multivariate statistical model. The model output is used to calculate statistics and provide a quantitative measure of the status of casting conditions. The results are graphically displayed to the operator as continuous trends. These trends provide a quantitative signal on the status of casting conditions over a period of time as shown in FIG. 3.

Another feature of the Multivariate Statistical Model-based Breakout Prediction System is the capacity to provide diagnostic information about the casting operation. When the system detects that conditions for a breakout are increasing, graphical information is displayed indicating which process measurements (or combination thereof are most different from normal operation. FIGS. 4, 5, and 6 show the graphical diagnostic displays for the three test statistics. These diagnostic displays are accessed by selecting the appropriate option on the main alarm screen, shown in FIG. 3.

The system may also generate output signals to automatically avert or mitigate an alarm condition, typically, by controlling the speed of the caster.

It will be understood that several variants may be made to the above-described embodiment of the invention, within the scope of the appended claims. Those skilled in the art will appreciate that the method may be applied to operations other than a continuous caster and that multivariate statistical models other than principal component analysis (PCA) may be suitable for such applications and could also provide meaningful test statistics when applied to monitoring the operation of a continuous caster.

Further, it will be understood that monitoring of a continuous caster may be done in order to take corrective action to prevent a breakout but could also be done in order to allow analysis of the effect of changing input parameters such as steel composition and to thereby allow the operation to be performed without undue experimentation.

What is claimed is:

1. A method for monitoring the operation of a continuous caster operating at a predetermined caster speed, the method including the following steps:

acquiring off-line measurements of process parameters
    selecting training data from said off-line measurements of process parameters to represent normal operation of a continuous caster;

development of a multivariate statistical model corresponding to normal operation of the continuous caster with input from said training data;

generation of detection thresholds from said multivariate statistical model and from said off-line measurements of process parameters;

acquiring on-line measurements of process parameters during operation of the continuous caster; and determining whether said on-line measurements of process parameters are consistent with normal operation of the continuous caster according to said multivariate statistical model, characterized in that
said multivariate statistical model is used to calculate an output vector of scores with input from said on-line process parameters;
test statistics are calculated from said vector of scores including calculating at least one univariate test statistic on one of said scores, and a multivariate test statistic on a selected number of said scores; and
said at least one univariate test statistic and multivariate test statistic are compared to said detection thresholds to generate a detection signal, said detection signal being indicative of whether the continuous caster is operating normally and whether corrective action to control the caster speed is required.

2. Method according to claim 1 in which the multivariate statistical model is a Principal Component Analysis (PCA) model.

3. Method according to claim 1 in which said at least one univariate test statistic is selected from the group consisting of Squared Prediction Error (SPE) and a "Hotelling T".

4. Method according to claim 1 in which said multivariate test statistic is a "Hotelling T".

5. Method according to claim 2 in which said output vector of scores includes a statistically significant first score and a "Hotelling T" univariate test statistic is calculated from said first score.

6. Method according to claim 2 in which said output vector of scores is limited to n significant components and a "Hotelling T" multivariate test statistic is calculated from n-1 scores.

7. Method according to claim 1 in which said output vector of scores is limited to a number of components n which is sufficient to explain at least 80% variation in the training data.

8. Method according to claim 1 in which said off-line and on-line measurements of process parameters include mould width, mould thermocouple readings, mould level, caster speed, mould cooling water flow, mould cooling water temperature differences and a measure of mould level control actuation.

9. Method according to claim 8 in which said mould thermocouple readings are taken from thermocouples spaced along a width and length of a continuous caster mould at a first predetermined height to define an upper ring and at a second predetermined height to define a lower ring, said upper ring and lower rings being vertically spaced in a casting direction for the continuous caster.

10. Method according to claim 9 in which said off-line and on-line measurements of process parameters additionally include temperature differences between pairs of vertically spaced thermocouples in said upper ring and lower ring respectively.

11. Method according to claim 9 in which measurements of off-line process parameters are categorized into periods of normal operation and abnormal operation of the continuous caster and a training data set is selected from said measurements taken during periods of normal operation of the continuous caster in which:
there is a temperature separation of at least 10° C. between upper and lower mould thermocouple readings;
there is a consistent temperature of +/−10° C. from the upper and lower thermocouple readings, respectively; and
there is a stable mould level control of +/−5 mm.

12. Method according to claim 11 in which the training data set corresponds to a period of normal operation of a continuous caster which lasts at least 60 seconds.

13. Method according to claim 11 in which the training data set corresponds to a period of normal operation of a continuous caster which lasts at least 150 seconds.

14. Method according to claim 11 in which several training data sets are concatenated to construct a large matrix of input data for development of said multivariate statistical model.

15. Method according to claim 8 in which said off-line and on-line measurements of process parameters additionally include past readings of said mould thermocouple readings.

16. Method according to claim 8 in which said off-line and on-line measurements of process parameters additionally include past readings of the caster speed.

17. Method according to claim 16 in which said past readings of the caster speed include measurements taken from five consecutive samples, a caster speed from a seventh prior sample and a caster speed from a tenth prior sample.

18. Method according to claim 8 in which the measure of mould level control actuation is calculated from a ratio of a measured position of a control valve to control flow of hot metal from a tundish into a mould to a predicted position of the control valve.

19. Method according to claim 8 in which said process parameters additionally include variables selected from the following group: mould oscillation frequency, tundish weight, and tundish temperature.

20. Method according to claim 1 in which said measurements of process parameters are sampled at a rate of not less than once per second.

21. Method according to claim 20 in which said measurements of process parameters are sampled at a rate of not less than twice per second.

22. Method according to claim 1 in which said detection thresholds are selected to generate a long-term alarm rate of under 2% for all test statistics.

23. Method according to claim 1 in which on-line measurements of thermocouple readings, mould cooling water flow, and mould cooling water temperature differences are selected and filtered to compensate for shifts in readings.

24. Method according to claim 23 in which filtering is done using an Exponentially Weighted Moving Average, EWMA, filter to dynamically calculate a mean of said selected on-line measurements.

25. Method according to claim 1 in which missing on-line process parameters are identified and tagged and compensated by adjusting appropriate model parameters to zero and proportionally scaling remaining parameters to provide a valid output.

26. Method according to claim 25 in which missing on-line process parameters include measurements from failed thermocouples.

27. Method according to claim 1 in which respective multivariate statistical models are developed from respective training data sets, each corresponding to normal operation of a continuous caster having a predefined cast width range.

28. Method according to claim 1 in which a detection signal associated with abnormal operation of the continuous caster and persisting for a predetermined minimum number of samples of on-line measurements of process parameters triggers an alarm.

29. Method according to claim 28 in which the alarm is a visual alarm.

30. Method according to claim 28 in which the alarm, is an audible alarm.

31. Method according to claim 1 in which said test statistics are graphically displayed.

32. Method according to claim 31 in which graphical displays of said test statistics are associated with diagnostic graphical displays of contribution plots indicative of whether on-line process parameters are consistent with normal operation of the continuous caster.

33. System for monitoring the operation of a continuous caster operating at a predetermined caster speed, the system having
- a data collection device for acquiring off-line measurements of process parameters selected to represent normal operation of a continuous caster and for creating a training data matrix X;
- a computational device for decomposing a matrix $X^T X$ and determining a selected number of significant components to define a multivariate statistical model corresponding to normal operation of the continuous caster;
- a computational device for generating detection thresholds from said multivariate statistical model and from off-line measurements of process parameters;
- data collection device for acquiring on-line measurements of process parameters during operation of the continuous caster and creating a real time input data vector Z;
- a computational device for calculating an output vector T of scores using said multivariate statistical model and said input data vector Z;
- a computational device for calculating test statistics from said vector T of scores including calculating at least one univariate test statistic on one of said scores, and a multivariate test statistic on a selected number of said scores;
- a computational device for comparing said univariate test statistic and multivariate test statistic to said detection thresholds and generating a detection signal; and
- display means associated with said detection signal to signal abnormal operation of the continuous caster.

34. System according to claim 33 in which the multivariate statistical model is a Principal Component Analysis (PCA) model.

35. System according to claim 34 in which said at least one univariate statistical test is selected from the group consisting of Squared Prediction Error (SPE) and a "Hotelling T" test.

36. System according to claim 34 in which said multivariate statistical test is a "Hotelling T" test.

37. System according to claim 33 in which said data collection device for acquiring on-line measurements of process parameters includes a computational device to calculate lagged parameter values using past readings.

38. System according to claim 33 in which said data collection device for acquiring on-line measurements of process parameters is configured to sample measurements of process parameters at a rate of no less than once per second.

39. System according to claim 33 in which said data collection device for acquiring on-line measurements of process parameters is configured to sample measurements of process parameters at a rate of no less than twice per second.

40. System according to claim 33 having a computational device to partition said off-line measurements of process parameters into periods of normal operation and abnormal operation and to create a training data set according to predefined criteria consistent with normal operation of a continuous caster.

41. System according to claim 40 including a computational device to concatenate several training data sets and construct a large matrix of input data X.

42. System according to claim 33 in which said data collection device for collecting on-line measurements of process parameters is associated with a filtering device to compensate for shifts in readings from selected process parameters.

43. System according to claim 33 having a data marking tool to tag predetermined on-line process parameters missing from the real time input data vector Z and to compensate vector Z for said on-line process parameters missing from the real time input data vector Z.

44. System according to claim 33 having initiation means corresponding to a pre-defined cast width range and adapted to select a multivariate statistical model associated with said pre-defined cast width range.

45. System according to claim 33 having an alarm which is triggered by said detection signal to display that an abnormal operation of the continuous caster is occurring.

46. System according to claim 45 in which said alarm is a visual alarm comprising a visual display screen configured to change its background color in accordance with the magnitude of said detection signal.

47. System according to claim 45 having an audible alarm device.

48. System according to claim 33 having a visual display screen for displaying said test statistics.

49. System according to claim 48 in which said visual display screen is configured to display contribution plots associated with a respective statistical test.

50. System according to claim 48 in which said visual display screen is configured to display time traces of on-line process parameters.

51. System according to claim 33 having control means operatively connected to said detection signal for automatically adjusting said predetermined caster speed.

* * * * *